United States Patent
Krishnan et al.

(10) Patent No.: US 7,137,003 B2
(45) Date of Patent: Nov. 14, 2006

(54) SUBSCRIBER IDENTITY MODULE VERIFICATION DURING POWER MANAGEMENT

(75) Inventors: Chidambaram Krishnan, San Diego, CA (US); James A. Hutchison, IV, San Diego, CA (US); Tom Summers, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 613 days.

(21) Appl. No.: 09/881,868

(22) Filed: Jun. 15, 2001

(65) Prior Publication Data

US 2002/0120857 A1   Aug. 29, 2002

Related U.S. Application Data

(60) Provisional application No. 60/271,789, filed on Feb. 27, 2001.

(51) Int. Cl.
- *H04L 9/00* (2006.01)
- *G06F 1/32* (2006.01)
- *G06F 7/04* (2006.01)
- *G06F 1/26* (2006.01)
- *H04M 1/66* (2006.01)

(52) U.S. Cl. .................. 713/172; 713/320; 726/19; 726/36; 455/410

(58) Field of Classification Search .............. 713/172, 713/300, 320; 726/19, 36; 455/410
See application file for complete search history.

(56) References Cited

U.S. PATENT DOCUMENTS

| | | | |
|---|---|---|---|
| 5,103,459 A | | 4/1992 | Gilhousen et al. |
| 5,537,474 A | * | 7/1996 | Brown et al. ............... 380/248 |
| 5,680,626 A | * | 10/1997 | Chu et al. ................... 713/322 |
| 5,987,614 A | * | 11/1999 | Mitchell et al. ............. 713/300 |
| 6,014,748 A | * | 1/2000 | Tushie et al. ................ 713/200 |
| 6,094,573 A | * | 7/2000 | Heinonen et al. ......... 455/412.1 |
| 6,115,823 A | * | 9/2000 | Velasco et al. ............. 713/322 |
| 6,124,799 A | | 9/2000 | Parker |
| 6,125,283 A | * | 9/2000 | Kolev et al. ............. 455/552.1 |
| 6,138,005 A | | 10/2000 | Park |

(Continued)

FOREIGN PATENT DOCUMENTS

EP   0657873   12/1994

(Continued)

OTHER PUBLICATIONS

Sim et al, Characteristics of closed loop power control algorithms for cellular DS/CDMA system, 1998, IEEE, pp. 355-362.*

(Continued)

*Primary Examiner*—Gilberto Barron, Jr.
*Assistant Examiner*—Aravind K Moorthy
(74) *Attorney, Agent, or Firm*—Philip R. Wadsworth; Charles D. Brown; George C. Pappas (57) ABSTRACT

Power management techniques for a Subscriber Identity Module (SIM) of a wireless communication device (WCD) are described tat make use of a unique identifier for the SIM. In particular a processor within the WCD reads a first unique identifier from the SIM when power is initially supplied to the WCD, and stores the first unique identifier within a computer-readable medium within the WCD. During a power management cycle, where power is terminated and then re-supplied to the SIM, the processor again receives a unique identifier from the SIM and compares the second unique identifier with the stored unique identifier. These tecbniques are useful in detecting whether the attached SIM has been exchanged for a different SIM while powered down during a power management cycle.

20 Claims, 7 Drawing Sheets

U.S. PATENT DOCUMENTS

| | | | |
|---|---|---|---|
| 6,282,614 B1* | 8/2001 | Musoll | 711/122 |
| 6,366,777 B1* | 4/2002 | Uusitalo | 455/433 |
| 6,369,710 B1* | 4/2002 | Poticny et al. | 340/572.1 |
| 6,466,781 B1* | 10/2002 | Bromba et al. | 455/411 |
| 6,480,725 B1* | 11/2002 | Cassidy et al. | 455/558 |
| 6,484,022 B1* | 11/2002 | Findikli et al. | 455/411 |
| 6,662,023 B1* | 12/2003 | Helle | 455/558 |
| 6,680,920 B1* | 1/2004 | Wan | 370/311 |
| 2006/0043202 A1* | 3/2006 | Kim et al. | 235/492 |
| 2006/0105812 A1* | 5/2006 | Shin | 255/558 |
| 2006/0112423 A1* | 5/2006 | Villadiego et al. | 726/9 |
| 2006/0122902 A1* | 6/2006 | Petrov et al. | 705/26 |
| 2006/0175416 A1* | 8/2006 | Ho | 235/492 |
| 2006/0183355 A1* | 8/2006 | Nishizawa et al. | 439/60 |
| 2006/0186211 A1* | 8/2006 | Kim et al. | 235/492 |

FOREIGN PATENT DOCUMENTS

| | | |
|---|---|---|
| EP | 0822730 | 2/1998 |
| WO | WO02069655 A2 * | 9/2002 |

OTHER PUBLICATIONS

Sim et al, Characteristics of closed loop power control algorithms for cellular CDMA system, 1999, IEEE, pp. 911-921.*

Anonymous, Power Solutions for GSM handsets, 2000, Wireless Design & Development, p. 18.*

Niiranen, Kassu, Highly Integrated, system-level GPRS solutions, 2002, Wireless Design & Development, pp. 20-22.*

Yasukawa, H. "Spectrum Broadening of Telephone Band Signals Using Multirate Processing for Speech Quality Enhancement" IEICE Transactions on Fundamentals of Electronics, Communications and Computer Sciences, Institute of Electronics Information and Comm. Eng. Toyko, JP., vol. E78-A:8. pp. 996-998 (1995).

* cited by examiner

SUBSCRIBER IDENTITY MODULE VERIFICATION DURING POWER MANAGEMENT

This application claims priority from U.S. Provisional Application Ser. No. 60/271,789, entitled "IMPROVED POWER MANAGEMENT FOR SIM CARDS," filed Feb. 27, 2001.

FIELD invention relates generally to wireless communication devices and, more particularly, to wireless communication devices that include a Subscriber Identity Module (SIM).

BACKGROUND

A Subscriber Identity Module (SIM), such as a Removable User Identity Module (R-UIM), Universal Subscriber Identity Module (USIM), or GSM SIM, contains information relating to a user of a wireless communication device (WCD). A typical WCD may take the form of a cellular radiotelephone, satellite radiotelephone, a PCMCIA card incorporated within a computer, a PDA equipped with wireless communication capabilities, and the like.

A SIM typically includes a controller and memory housed in a card-like structure. The memory may contain user information including, for example, a subscriber/user identifier, a phonebook providing a stored bank of telephone numbers, messages, billing codes, encryption sequences for secure wireless data communication, and other useful information that can be retrieved during use. The memory also may store applications that are accessed by the WCD, e.g., for over-the-air service provisioning, cryptography, web browsing, or mobile commerce.

Typically, a SIM is removable, enabling a user to install the SIM in, or remove the SIM from, a WCD. The SIM can be removed from a first WCD, for example, and installed in a second WCD. In this manner, the SIM enables the user to transfer user information from one WCD to another WCD. This can be especially useful when the user travels to regions supported by different wireless protocols, which may require the use of a different WCD.

A SIM includes a relatively simple electrical interface, including an input/output (I/O) port for exchanging serial data with another device such as a WCD, a clock input for receiving an external clock signal, and a reset input for receiving a reset signal. A SIM ordinarily receives power from the device in which it is installed.

A WCD typically is powered by a rechargeable power source such as a Lithium Ion battery. Power consumption by the SIM can be a significant factor in overall WCD power consumption. A SIM consumes battery reserves and can reduce standby time for the WCD. Accordingly, efficient management of power consumption by a SIM is highly desirable.

SUMMARY

The invention is directed to power management techniques for a Subscriber Identity Module (SIM), such as a Removable User Identity Module (R-UIM), Universal Subscriber Identity Module (USIM), or GSM SIM used with a wireless communication device (WCD). In particular, the invention is useful in detecting whether a user has exchanged a SIM during a power management cycle in which the SIM was powered down to conserve energy. In this manner, the invention provides techniques that verify the integrity of a SIM upon power-up from a power management cycle.

In one embodiment, the invention provides a method for controlling access to a SIM after a power management cycle. In particular, a first unique identifier for a SIM is stored within a wireless communication device (WCD), typically upon initial power-up of the WCD. A second unique identifier is received for a SIM coupled to the WCD upon supplying power to the SIM during a power management cycle. Access to the SIM is controlled based on the first unique identifier and the second unique identifier. The SIM is declared faulty, for example, when the first unique identifier does not equal the second unique identifier. In one embodiment, the first and second unique identifiers comprise Integrated Circuit Card Identifiers (ICCIDs) as defined by the ETSI TS 100 977 standard.

In another embodiment, the invention provides a wireless communication device (WCD) in which a memory stores a first unique identifier when power is initially applied to the WCD. A processor within the WCD receives a second unique identifier for a subscriber identity module (SIM) coupled to the WCD upon re-supplying power to the SIM during a power management cycle, and controls access to the SIM based on the first unique identifier and the second unique identifier.

The invention is capable of providing a number of advantages. For example, caching and verifying the unique identifier for the SIM allows the power management routine to verify that the attached SIM at power down has not been exchanged for a different SIM while powered down. This is advantageous in verifying the integrity of the SIM for other software or hardware modules within the WCD that need to access or otherwise utilize the SIM.

The above summary of the invention is not intended to describe every embodiment of the invention. The details of one or more embodiments of the invention are set forth in the accompanying drawings and the description below. Other features, objects, and advantages of the invention will be apparent from the description and drawings, and from the claims.

DETAILED DESCRIPTION

Figure 1:
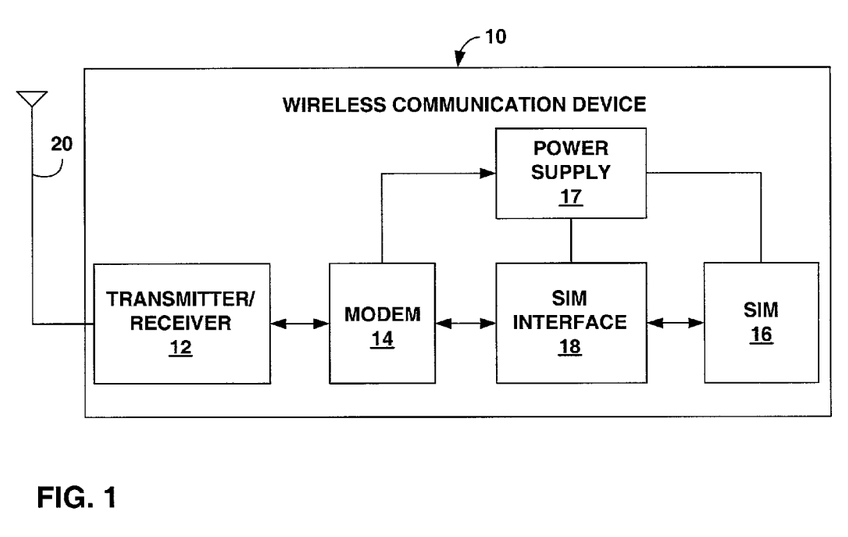
FIG. 1 is a block diagram illustrating a WCD that incorporates a SIM.

FIG. 1 is a block diagram illustrating an example wireless communication device (WCD) 10 that incorporates a subscriber identity module (SIM) 16. As shown in FIG. 1, WCD 10 may include, in addition to SIM 16, a radio frequency transmitter/receiver 12, a modem 14, a SIM interface 18, and a radio frequency antenna 20. FIG. 1 also shows a power supply 17 that may provide power to SIM 16 and SIM interface 18. Modem 14 may be configured to control power supply 17 to selectively deliver power to SIM 16, SIM interface 18, or both. Non-limiting examples of WCD 10 include a cellular radiotelephone, satellite radiotelephone, a PCMCIA card incorporated within a computer, a PDA equipped with wireless communication capabilities, and the like.

WCD 10 may emit signals via antenna 20 that conform to any number of communication protocols including, for example, a Code Division Multiple Access (CDMA), WCDMA or GSM protocol. Modem 14 includes demodulator/decoder circuitry and encoder/modulator circuitry, both of which are coupled to transmitter/receiver 12 to transmit and receive communication signals. SIM interface 18 includes circuitry that drives communication between modem 14 and SIM 16.

SIM 16 may take the form of a conventional SIM card based on ISO/IEC 7816 that can be installed in and removed from WCD 10. SIM 16 may be, for example, a Removable User Identity Module (R-UIM), Universal Subscriber Identity Module (USIM), or GSM SIM. SIM 16 may conform to any of the following SIM standards: TIA/EIA IS-820, ETSI TS 100 977 and ETSI TS 102 221. In addition, SIM 16 may conform to other standards that emerge in the future for SIM cards and other similar devices for carrying user information. Memory contained in SIM 16 may store a variety of information including subscriber/user identification, telephone numbers, messages, billing codes, encryption sequences, and the like, as well as applications accessed by WCD 10. WCD 10 accesses SIM 16 via SIM interface 18 to retrieve selected information as needed in the course of wireless communication.

As an illustration, when a user first powers up WCD 10, a CPU or other control logic, generally referred to herein as a processor, associated with SIM 16 may compare the subscriber/user identification to an access code, e.g., a series of numbers, entered into WCD 10 by the user via a keypad or other input device.

If the access code entered by the user is valid for SIM 16, the secure features of the SIM are activated for use by WCD 10. If not, the secure features of SIM 16 are locked and cannot be used. Specifically, the secure features of SIM 16 may remain locked until the SIM receives a valid access code from the user via WCD 10. The optional security authorization process is intended to verify that WCD 10 is in the possession of an authorized user, and repeats each time WCD powers up SIM 16. WCD 10 may retrieve other information from SIM 16, such as billing codes for use in cost accounting. In addition, WCD 10 may retrieve encryption sequences generated by or stored in SIM 16 to support more secure data or voice communication and access secure applications.

In accordance with the invention, WCD 10 performs a power management routine to conserve battery resources and extend standby time. In particular, WCD 10 performs a voting process to determine when to power-up and power-down SIM 16. The voting process is designed to make more efficient use of SIM 16 without sacrificing performance, and may be implemented in modem 14 to control power supply 17. For example, before powering down SIM 16, the voting process may be designed to evaluate present requirements of software modules running on the WCD 10 for access to SIMM 16. A software module may take the form of a thread, interrupt service routine, device driver, assembly routine, state transition, or the like that executes within an operating environment on the WCD 10 under the control of a CPU or other control logic.

If a software module running on WCD 10 has generated a command or request, or is otherwise performing some action that requires service by SIM 16, the SIM is not powered down. In addition, if a software module running on WCD 10 votes against powering down SIM 16, the SIM is not powered down. In this case, a software module on WCD 10 may anticipate the imminent need for service by SIM 16. Thus, to power down SIM 16, the power management routine determines that there are no pending commands and that no software module has voted against powering down SIM 16. In this manner, WCD 10 can efficiently manage power to SIM 16 to increase battery duration and standby time while minimizing adverse effects on performance.

WCD 10 also may be configured to cache particular information useful in the optional security authorization process to enhance user convenience. In particular, in conjunction with the power management routine, WCD 10 may cache an access code in memory associated with the WCD when a SIM powerdown/power-up cycle is invoked. This added feature promotes user convenience by eliminating the need to re-enter the access code when both the security authorization process and the power management routine are active. Instead, the cached access code can be used to complete the security authorization process in a seamless manner that is transparent to the user, without the need to substantially alter the security authorization process itself.

When SIM 16 powers up following a power-down invoked by the power management routine, WCD 10 retrieves the access code from the WCD memory, if the access code was cached, and sends it to the SIM for authentication of the user. SIM 16 completes the security authorization process by authenticating the cached access code and thereby maintains the WCD in an active, operative state for the user. In this manner, each time SIM 16 is powered down for purposes of the power management routine, WCD 10 and SIM 16 together carry out the security authorization process without requiring the user to enter the access code into the WCD, e.g., via the keypad. When the user purposely powers down WCD 10, however, the user is forced to enter the access code when the security authorization process is active. In that case, WCD 10 does not cache the access code. Thus, the power management routine can achieve improved power efficiency without the need to substantially modify the security authorization process.

Figure 2:
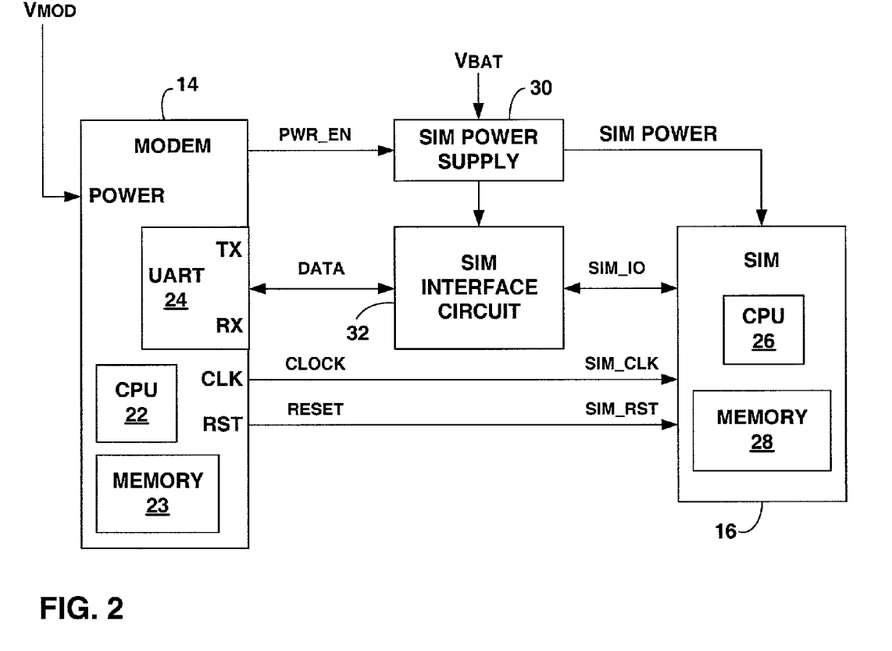
FIG. 2 is a block diagram illustrating a power management system for a WCD that incorporates a SIM.

FIG. 2 is a block diagram illustrating an exemplary power management system for a WCD 10 that incorporates SIM 16. As shown in FIG. 2, modem 14 may incorporate a central processing unit (CPU) 22 or other control logic, generally referred to herein as a processor or CPU, and a universal asynchronous receiver/transmitter (UART) circuit 24. CPU 22 functions as a modem controller, and may be a 32-bit controller such as a 32-bit reduced instruction set controller (RISC) controller. Accordingly, the data I/O bus associated with UART circuit 24 may be a 32-bit bus.

Modem 14 also may include a memory 23 that contains instructions for execution by CPU 22, and provides storage space for information stored by the CPU of other components. In addition, modem 14 may include an I/O port for communication with SIM 16. For example, modem 14 may include a data I/O port by which a transmitter and receiver in UART circuit 24 respectively transmit data to and receive data from SIM 16 under control of CPU 22. In the example of FIG. 2, modem 14 also includes clock and reset output ports (CLK and RST) that transmit clock and reset signals to SIM 16 to drive synchronous communication between the modem and SIM.

Modem 14 can selectively enable and disable the clock signal SIM_CLK to control SIM 16. The reset signal SIM_RST can be used to reset SIM 16, and can be selectively asserted and deasserted by modem 14. WCD 10 and, in particular, UART circuit 24 may conform substantially to that described in copending U.S. patent application Ser. No. 09/773,768, filed Feb. 2, 2001, and entitled "CIRCUIT AND METHOD FOR INTERFACING A MODEM IN A WIRELESS COMMUNICATION DEVICE TO A SUBSCRIBER INTERFACE MODULE," the entire content of which is incorporated herein by reference.

CPU 22 can be programmed to write data and commands to other components such as UART circuit 24, coupled to a data bus, and may be responsive to various interrupt signals generated by the components. CPU 22 may use, for example, memory mapped access, I/O port access, or other access techniques to interact with such components. Advantageously, CPU 22 may be used as both an SIM interface controller that controls interaction with and operation of SIM 16, and a modem controller that controls operations within modem 14 that may be unrelated to the operation of SIM. CPU 22 may be programmed to carry out various aspects of a power management routine in accordance with the invention, as well as certain aspects of a modified security authorization process.

SIM 16 may include a CPU 26 or other control logic and memory 28 that stores a variety of user information such as subscriber/user identification, telephone numbers, messages, billing codes, encryption sequences, secure applications and the like. SIM 16 includes an I/O port that receives data (SIM_IO) transmitted by UART circuit 24, a clock input (SIM_CLK), and a reset input (SIM_RST). SIM power supply 30 generates power from a battery voltage $V_{BAT}$ associated with a battery connected to power supply 30, and applies it to SIM 16. SIM power supply 30 of FIG. 2 may correspond to power supply 17 of FIG. 1. A SIM interface circuit 32 provides driver circuitry. In particular, SIM interface circuit 32 permits modem 14 to transmit data to and receive data from SIM 16 over a common data line, indicated by UIM_IO. As further shown in FIG. 2, SIM power supply 30 also may generate power for SIM interface circuit 32. Modem 14 receives a modem supply voltage $V_{MOD}$ from another power supply (not shown).

In the example of FIG. 2, modem 14 includes a power enable output that emits a PWR_EN signal. The PWR_EN signal controls SIM power supply 30 to either supply or terminate power from SIM power supply 30 to SIM 16 and SIM interface circuit 32. Under control of CPU 22, for example, modem 14 may deactivate SIM power supply 30 or decouple it from SIM 16 and SIM interface circuit 32, e.g., via one or more switches that decouple respective power supply lines.

When SIM power supply 30 is deactivated or decoupled, SIM 16 and SIM interface circuit 32 are powered down, and cease to consume battery resources. Power to SIM 16 alternatively may be terminated under control of CPU 22 by first terminating the clock signal applied to SIM interface circuit 32 by modem 14. In this case, however, SIM 16 and SIM interface circuit 32 may continue to consume a small amount of power until supply of power from SIM power supply 30 is terminated.

Before asserting or deasserting the PWR_EN signal to terminate power, modem 14 carries out a voting process under control of CPU 22 to manage power. As an illustration, modem 14 may continue to supply power to SIM 16 when a request from a software module running on the WCD 10 is pending for service by the SIM, or when a software module running on the WCD requests maintenance of power to the SIM. In the first case, a request is actively pending for service by SIM 16. Modem 14 may determine whether a request is pending for service by SIM 16 by inspecting a request queue associated with SIM 16. The request queue may be provided in memory carried by WCD 10, such as memory 23, and accessible by CPU 22.

In the second case, no request is pending for service by SIM 16, but a software module running on WCD 10 anticipates generation of such a request and "votes" against powering down the SIM. Modem 14 may poll one or more processes running on WCD 10 to obtain the necessary votes before powering down SIM 16. Alternatively, modem 14 may refer to voting information in the form of a data structure, such as a bit mask, that stores an indication of the votes registered by the processes. The bit mask may include, for example, bits that correspond to software modules or processes running on WCD 10. If a software module requests supply of power to SIM 16, it may assert the corresponding bit in the bit mask. If any of the bits in the bit mask is asserted, modem 14 maintains the supply of power to SIM 16.

Modem 14 terminates power to SIM 16 when no request from WCD 10 is pending for service by the SIM and no software module running on the WCD requests supply of power to the SIM. Thus, modem 14 ensures that there is no pending request and that no software module anticipates such a request before powering down SIM 16. In this manner, modem 14 is able to efficiently manage power without significantly undermining performance. Specifically, modem 14 avoids the latency caused by a power-down and power-up cycle when a request is pending or anticipated, and thus the resultant performance degradation.

Upon powering down SIM 16, modem 14 may consult the processes running on WCD 10, a request queue, or a data structure such as a bit mask, to determine whether to re-initiate supply of power. A variety of software modules running on WCD 10 may require access to, or service by, SIM 16 including, for example, processes for operation of air interfaces such as AMPS (Advanced Mobile Phone System) or CDMA that require number assignment module (NAM) information stored on the SIM, the security authorization process upon power-up of following a manual lock-out, encryption processes that require access to key information provided by the SIM, and the like.

Figure 3:
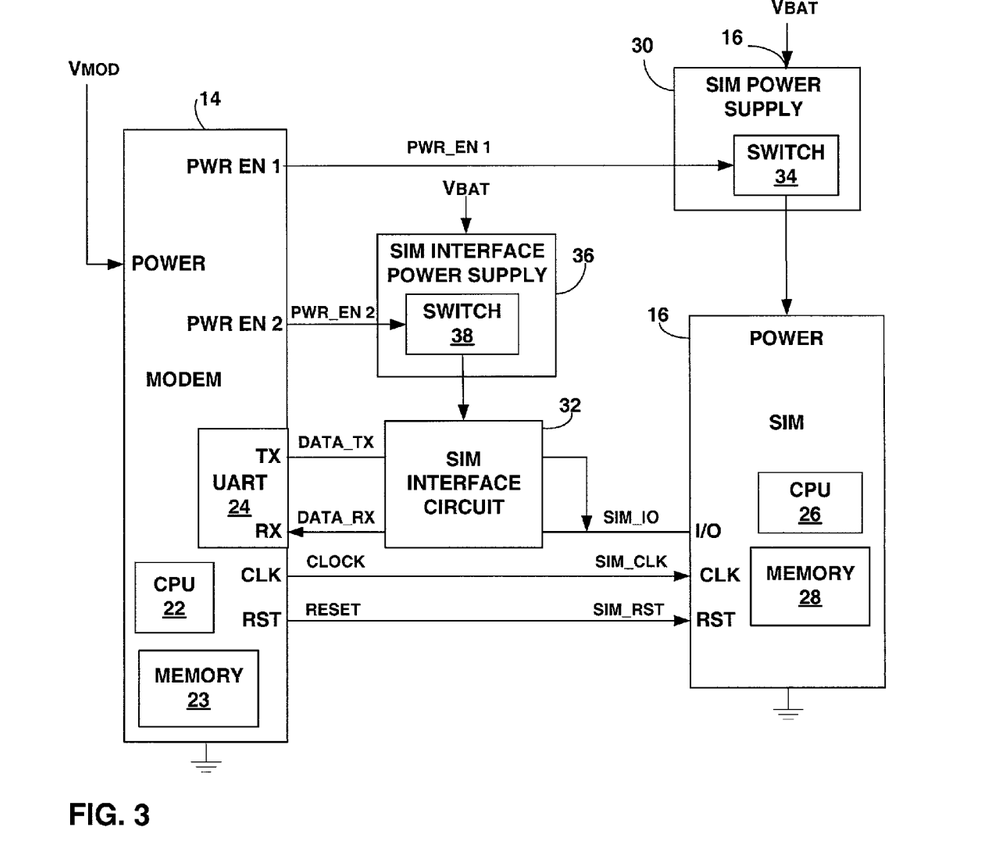
FIG. 3 is a block diagram illustrating another power management system for a WCD that incorporates a SIM.

FIG. 3 is a block diagram illustrating another power management system for a WCD 10 that incorporates a SIM 16. The system of FIG. 3 corresponds substantially to that of FIG. 2. FIG. 3 illustrates SIM interface circuit 32 in slightly greater detail, however, depicting transmitted data line DATA_TX and received data line DATA_RX coupled to UART circuit 24. Also, in the example of FIG. 3, SIM 16 and SIM interface circuit 32 have separate power supplies. In particular, SIM 16 receives power from SIM power supply 30, whereas SIM interface circuit 32 receives power from SIM power supply 36. According to this example, modem 14 may generate first and second power enable signals PWR_EN 1 and PWR_EN 2. The first power enable signal PWR_EN 1 controls a switch 34 associated with SIM power supply 30 to selectively supply and terminate power to SIM 16.

The second power enable signal PWR_EN 2 controls a switch 38 associated with SIM interface power supply 36 to selectively supply and terminate power to SIM interface circuit 32. In this manner, modem 14 can control power to SIM 16 and SIM interface circuit 32 independently of one another. In some cases, for example, it may be desirable to maintain power to SIM interface circuit 32 upon termination of power to SIM 16. In addition, as a practical matter, independent control may be necessary when SIM 16 and SIM interface circuit 32 have different power supplies.

Figure 4:
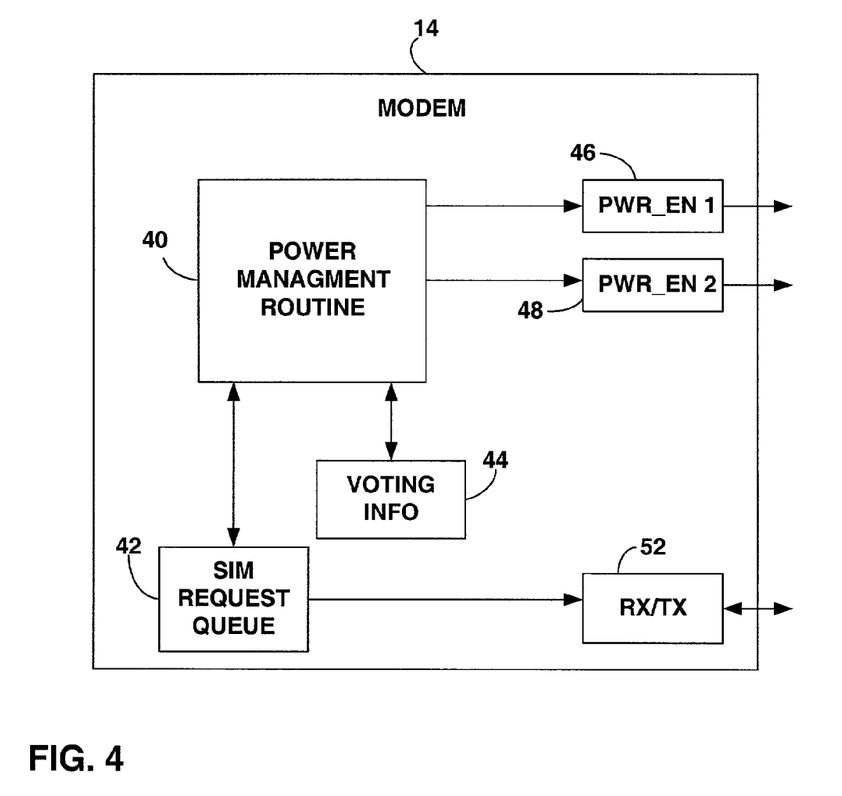
FIG. 4 is a block diagram illustrating a power management routine for a WCD that incorporates a SIM.

FIG. 4 is a functional block diagram illustrating a power management routine for a WCD that incorporates a SIM. In particular, FIG. 4 illustrates the operation of modem 14 in administering a voting process and managing power to a SIM. As shown in FIG. 4, a power management routine 40 executing in an operating environment provided by modem 14 may determine whether a SIM request queue 42 contains a pending request for service by SIM 16. As described below, various software modules executing within the operating environment provided by modem 14 may modify a set of voting information 44. In some embodiments, voting information 44 may take the form of a data structure, such as a bit mask, in which particular bits correspond to votes for difference software modules or processes. Modem 14 may assert a corresponding vote within voting information 44 in response to a user or air interface event that requires continuous power to SIM 16. The vote may be deasserted later, for example, when a command or request associated with the event has been served by SIM 16, unless the software module determines that another command or request is pending.

The request may be communicated to SIM 16 via an RX/TX section 52 in UART 24. In addition, power management routine 40 inspects voting bit information 44 to determine whether any of the processes running on WCD 10 have voted for maintenance of power to SIM 16. In the event a request is pending in SIM request queue 42 or a bit is asserted in the voting information bit mask 44, power management process 40 maintains power to SIM 16 and SIM interface 32 by continued assertion of PWR_EN 1 and PWR_EN2 signals 46, 48.

Figure 5:
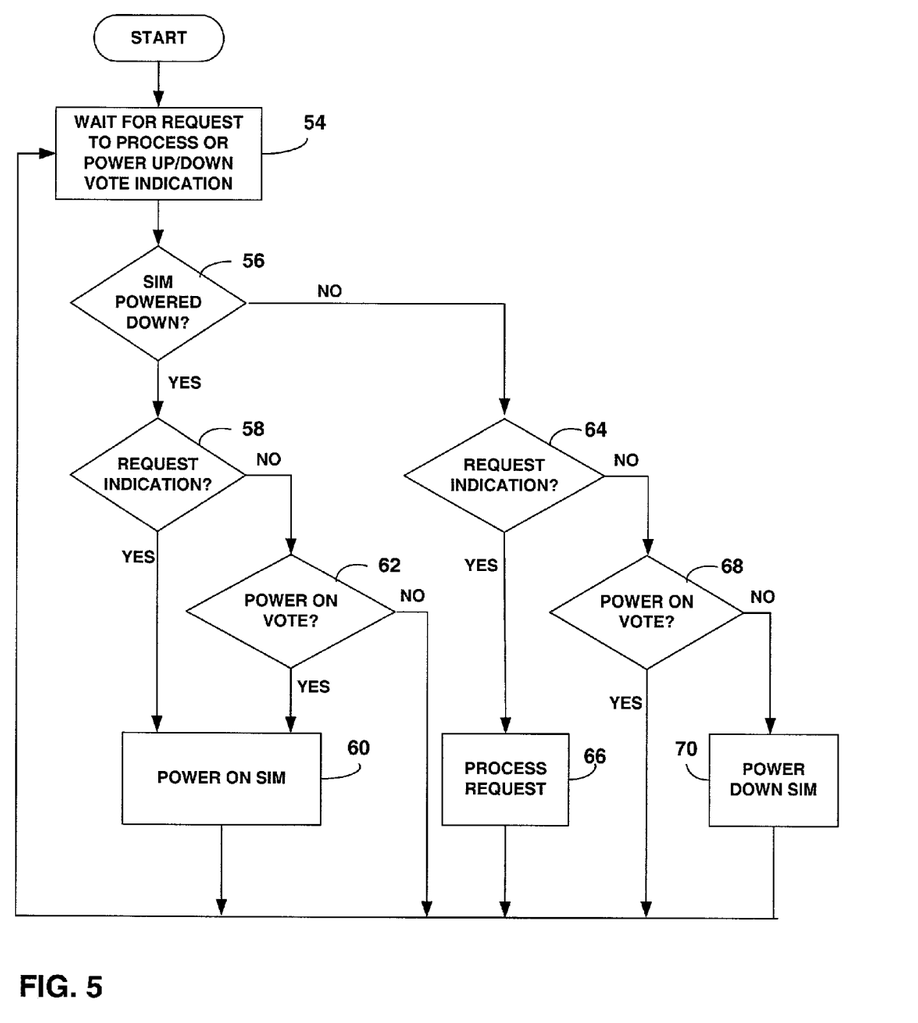
FIG. 5 is a flow diagram illustrating a power management routine for a WCD that incorporates a SIM.

FIG. 5 is a flow diagram illustrating a power management routine for a WCD 10 that incorporates a SIM 16. As shown in FIG. 5, the power management routine waits for either a request to process, or a power up/down vote indication (54). In other words, modem 14 refers to a request queue for SIM 16 to determine whether there are any pending requests, and administers a voting process to determine whether any processes have requested, directly or indirectly, maintenance of the supply of power to SIM 16.

In the event SIM 16 is already powered down (56), the routine determines whether a request is indicated, i.e., whether a software module has issued a command or other operation that must be processed (58), e.g., by reference to the SIM request queue. If a request is indicated, i.e., pending, the power management process powers on SIM 16 (60). If no request is indicated, the routine determines whether there is a power on vote (62) among any of the WCD software modules or processes that interact with SIM 16. If so, the process powers on SIM 16 (60). If not, the power management process returns to step 54.

If SIM 16 is not powered down (56), the power management process determines whether there is a request indication (64). If so, modem 14 passes the request to SIM 16 for processing in the ordinary course (66). If not, the power management process determines whether there is a power on vote (68). If there is no power on vote among the WCD software modules that interact with SIM 16, the power management process proceeds to power down SIM 16 (70). Again, the power on vote may be represented by respective bits in a bit mask stored in memory on WCD 10. By consulting the voting information and the request queue, the power management process avoids powering down SIM when a request is pending or imminent, and thereby promotes better performance.

Figure 6:
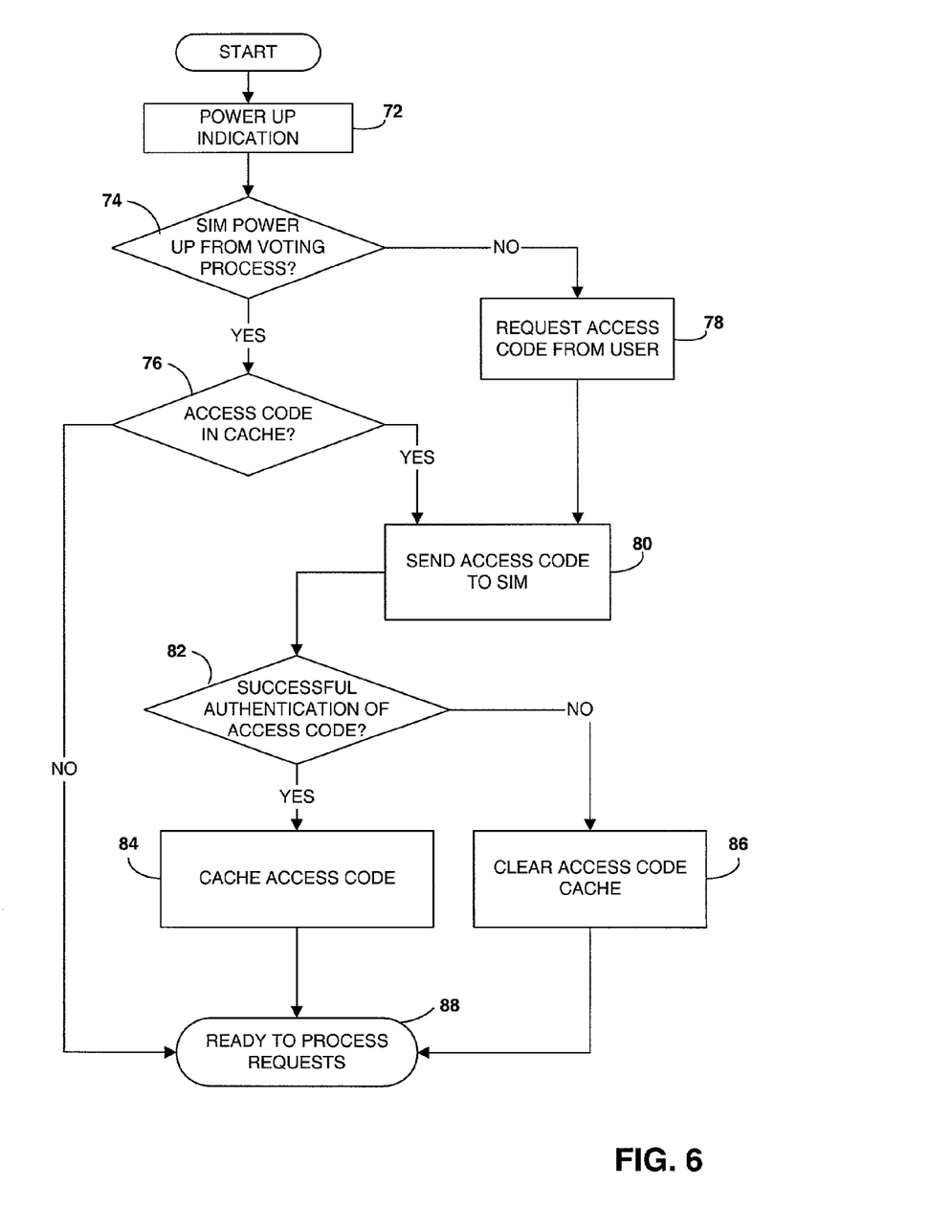
FIG. 6 is a flow diagram illustrating a security authorization process for a WCD that incorporates a SIM.

FIG. 6 is a flow diagram illustrating a modified security authorization process for a WCD 10 that incorporates a SIM 16 and provides a power management routine as described herein. Ordinarily, when WCD 10 is powered down, SIM 16 is also powered down. When WCD 10 is subsequently powered up, SIM 16 attempts to carry out a security authorization process in which an access code, such as a cardholder verification (CHV) code, is compared in the CPU of the SIM to a code entered by a user via a user interface such as a keypad associated with WCD 10.

When SIM 16 is powered down as a result of the power management routine described with reference to FIG. 5, the SIM attempts to carry out the same security authorization process. Because SIM 16 may be powered up and down many times during operation as part of the power management routine, entry of the access code by the user would be very inconvenient. Therefore, to promote user convenience, WCD 10 can be configured to store, or "cache," the access code in memory associated with the WCD.

When the access code is required upon power up following a power down executed by the power management routine, WCD 10 retrieves the cached access code from the memory and sends it to SIM 16 for use in the security authorization process to authorize use of the secure features of the SIM. In operation, WCD 10 stores the access code upon entry by the user and successful completion of the security authorization process.

As shown in FIG. 6, when there is a SIM power up indication (72), WCD 10 determines whether the power up resulted from the voting process associated with the power management routine (74). If so, WCD 10 determines whether the access code was cached by the WCD (76) upon the previous power down. Upon finding the cached access code, WCD 10 sends the access code to SIM 16 (80) for use in the security authorization process. Following successful authentication of the access code by SIM 16 (82), the access code is again cached by WCD 10 (84) for future use.

If the SIM power up is not the result of the voting process (74), WCD 10 requests the access code from the user (78), e.g., by prompting the user via a display and receiving the code via a keypad. Upon sending the access code to SIM (80), if authentication is not successfully completed, WCD 10 clears the access code cache (86). If there is no access code in the cache (76), the security authentication process is not completed. In each case, WCD 10 and SIM 16 are then ready to process requests (88). If authentication is not successfully completed, however, the secure operations of SIM 16 will not be performed successfully.

Instructions for causing a processor provided in WCD 10 or SIM 16, such as CPU 22 or CPU 26, to execute power management and security authorization processes as described herein may be stored on computer readable media. By way of example, and not limitation, computer readable media may comprise computer storage media and/or communication media. Computer storage media includes volatile and nonvolatile, removable and fixed media implemented in any method or technology for storage of information such as processor-readable instructions, data structures, program modules, or other data.

Computer storage media may include, but is not limited to, random access memory (RAM), read-only memory (ROM), EEPROM, flash memory, fixed or removable disc media, including optical or magnetic media, or any other medium that can be used to store the desired information and that can be accessed by a processor within WCD 10 of SIM 16. In particular, SIM 16 may carry onboard FLASH memory for storage of information and applications.

Communication media typically embodies processor readable instructions, data structures, program modules, or other data in a modulated data signal, such as a carrier wave or other transport medium and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Computer readable media may also include combinations of any of the media described above.

Figure 7:
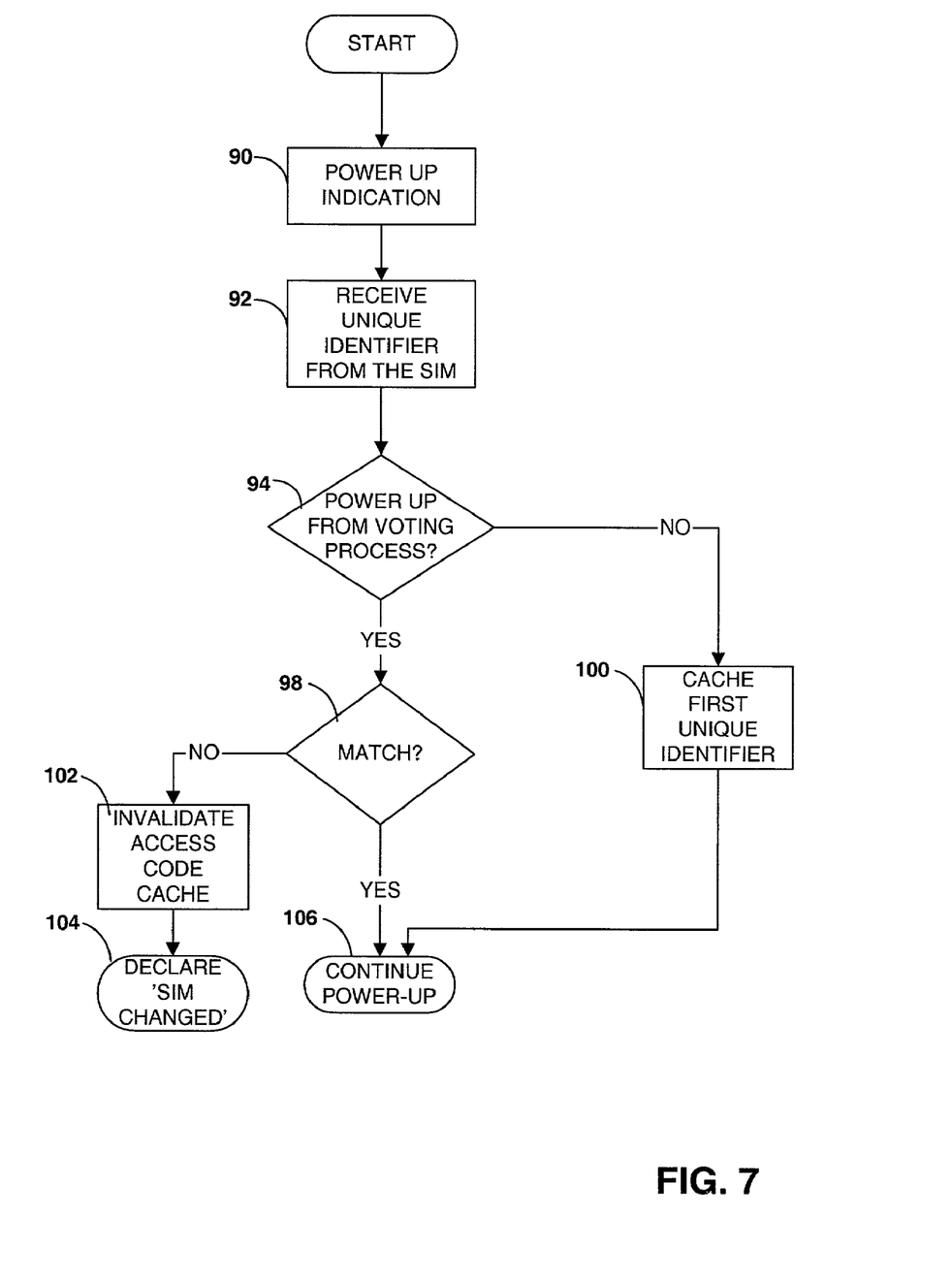
FIG. 7 is a flow diagram illustrating another example power management process for a WCD that incorporates a SIM.

FIG. 7 is a flow diagram illustrating an example process for verifying the integrity of SIM 16 after power up. In particular, the process illustrated in FIG. 7 is useful in verifying that SIM 16 has not been exchanged for a different SIM while powered down during a power management process (cycle).

When WCD 10 is powered-up (90), the power management routine receives a unique identifier from the currently attached SIM 16 (92). The power management routine may, for example, request from SIM 16 an Integrated Circuit Card Identifier (ICCID) as defined by the ETSI TS 100 977 standard.

Next, the power management routine determines whether the power-up indication resulted from initial power being applied to the WCD, or during a power management cycle. The power management routine may, for example, determine whether the power-up indication resulted from the voting process described above (94). If the power-up indication did not result from a voting process, the power management routine stores the unique identifier in, for example, a random access memory (RAM) or other computer-readable medium within modem 14 or other component of WCD 10 (100). After storing the unique identifier, the power management routine continues with the power-up process (106).

However, if the power management routine determines that the power-up was the result of a voting process, then the power management routine compares the received unique identifier with a unique identifier already cached in RAM within WCD 10 (98). Based on the comparison, WCD 10 controls access to SIM 16. If the unique identifier received from SIM 16 upon power-up matches the unique identifier stored in RAM, then the power management routine continues the power-up process described herein (106). If, however, the unique identifier received from SIM 16 upon power-up does not match the unique identifier stored in RAM, the power management routine determines that SIM 16 has been exchanged and controls access to SIM 16. WCD 10 may, for example, invalidate the access control cache (102) and declare SIM 16 as changed (104). Alternatively, power management routine may restart the modified security authorization process, or may terminate power to SIM 16.

In one embodiment, WCD 10 displays a status of the SIM card upon resupplying power to SIM 16. WCD 10 may display, for example, a message indicating whether SIM 16 was changed based upon a mismatch between the more recent unique identifier received from SIM 16 and the unique identifier stored in RAM.

In this manner, the power management routine is able to detect whether the currently attached SIM 16 has been exchanged for a different SIM while powered down. This is advantageous in verifying the integrity of SIM 16 for other software or hardware modules within WCD 10 that need to access or otherwise utilize SIM 16.

Various embodiments of the invention have been described. These and other embodiments are within the scope of the following claims.

The invention claimed is:

1. A Subscriber Identity Module (SIM) adapted for and powered by a wireless communication device (WCD), the WCD including a power management routine and a memory, the SIM comprising:
   means for storing a first unique identifier;
   means for receiving a second unique identifier from the WCD at an initial power up of the WCD, the second unique identifier being entered by a user of the WCD;
   means for accessing the first unique identifier at the initial power up of the WCD to compare the first unique identifier to the second unique identifier and to permit access to the SIM by the WCD based an the comparison;
   means for automatically receiving the second unique identifier at a subsequent power up of the SIM without the user re-entering the second unique identifier following the SIM having been powered down under control of a power management routine performed by the WCD;
   means for comparing the second unique identifier automatically received from the WCD to the first unique identifier following the subsequent power up; and
   means for enabling access of the SIM by the WCD) based on the comparison following the subsequent power up.

2. The SIM of claim 1, wherein the first and second unique identifiers comprise Integrated Circuit Card Identifiers (ICCIDS).

3. The SIM of claim 1, wherein the SIM includes an interface circuit for interfacing wit the WCD, the interface circuit terminating power to the SIM during powering down.

4. The SIM of claim 2, wherein the SIM includes an interface circuit for interfacing with the WCD, the interface circuit terminating power to the SIM during powering down.

5. A wireless communication device (WCD) including a power management routine and a memory and adapted for use with a Subscriber Identity Module (SIM), wherein the SIM stores a first unique identifier, the WCD comprising:
   means for storing in the memory a second unique identifier generated in response to a user performing an initial power up of the WCD, wherein the second unique identifier is compared to the first unique identifier stored in the SIM to permitting access to the SIM by the WCD following the initial power up;
   means, responsive to the power management routine, for powering down the SIM following the initial power up;
   means responsive to the power management routine for powering up the SIM following the powering down;
   means for automatically transmitting the second unique identifier to the SIM without the user re-entering the second unique identifier following the powering up by the means responsive to tbe power management routine; and
   means for detecting access to the SIM in response to the SIM matching the second unique identifier automatically transmitted from the WCD to the first unique identifier stored in the SIM.

6. The WCD of claim 5, wherein the first and second unique identifiers comprise Integrated Circuit Card Identifiers (ICCIDs).

7. The WCD of claim 6, wherein the SIM includes an interface circuit for interfacing with the WCD, the means for powering up the SIM including means for providing power to the SIM.

8. The WCD of claim 7, wherein the power management routine continues a power management cycle by maintaining power to the SIM when a match between the first and second identifiers occurs, and aborts the power-up process when a match between the first and second identifiers fails.

9. The WCD of claim 8, wherein the power management routine terminates power to the SIM in response to a power down command and on the basis of a voting process.

10. The WCD of claim 9, wherein terminating power to the SIM comprises terminating power to the SIM when to request is pending for service by the SIM and no software module running on the WCD requests maintenance of power to the SIM.

11. The WCD of claim 5, wherein the SIM includes an interface circuit for interfacing with the WCD, the means for powering up the SIM including means for providing power to the SIM.

12. The WCD of claim 5, wherein the power management routine continues a power management cycle by maintaining power to the SIM when a match between the first and second identifiers occurs, and aborts the power-up process when a match between the first and second identifiers fails.

13. The WCD of claim 12, wherein the power management routine terminates power to the SIM in response to a power down command and on the basis of a voting process.

14. The WCD of claim 13, wherein terminating power to the SIM comprises terminating power to the SIM when no request is pending for service by the SIM and no software module running on the WCD requests maintenance of power to the SIM.

15. A computer-readable storage medium comprising instructions, including a power management routine, stored thereon for causing a WCD including a memory and adapted for use with a Subscriber Identity Module (SIM) that stores a first unique identifier to:

store in the memory a second unique identifier generated in response to a user performing an initial power up of the WCD, wherein the second unique identifier is compared to the first unique identifier stored in the SIM to permit access to the SIM by the WCD following the initial power up;

power down the SIM in response to the power management routine following the initial power up;

power up the SIM in response to the power management routine following the power down;

automatically transmit the second unique identifier to the SIM without the user re-entering the second unique identifier following the power up in response to the power management routine; and detecting access to the SIM in response to the SIM matching the second unique identifier automatically transmitted from the WCD to the first unique identifier stored in the SIM.

16. The computer readable storage medium of claim 15, wherein the first and second unique identifiers comprise Integrated Circuit Card Identifiers (ICCIDs).

17. The computer readable storage medium of claim 16, wherein the power management routine continues a power management cycle by maintaining power to the SIM when a match between the first and second identifiers occurs and aborts the power-up process when a match between the first and second identifiers fails.

18. The computer readable storage medium of claim 17, wherein the power management routine terminates power to the SIM in response to a power down command and on the basis of a voting process.

19. The computer readable storage medium of claim 18, wherein terminating power to the SIM comprises terminating power to the SIM when no request is pending for service by the SIM and no software module running on the WCD requests maintenance of power to the SIM.

20. The computer readable storage medium of claim 15, wherein the SIM includes an interface circuit for interfacing with the WCD, the instructions for powering up the SIM including providing power to the SIM.

* * * * *